(12) United States Patent
Pachoud et al.

(10) Patent No.: US 10,342,214 B2
(45) Date of Patent: Jul. 9, 2019

(54) DEVICE AND METHOD TO TAG AN ANIMAL

(71) Applicant: DATAMARS SA, Lamone (CH)

(72) Inventors: Damien Pachoud, Pregassona (CH); Julien Buros, Cassina d'Agno (CH)

(73) Assignee: DATAMARS SA, Lamone (CH)

( * ) Notice: Subject to any disclaimer, the term of this patent is extended or adjusted under 35 U.S.C. 154(b) by 186 days.

(21) Appl. No.: 15/520,712

(22) PCT Filed: Oct. 22, 2014

(86) PCT No.: PCT/EP2014/072639
§ 371 (c)(1),
(2) Date: Apr. 20, 2017

(87) PCT Pub. No.: WO2016/062339
PCT Pub. Date: Apr. 28, 2016

(65) Prior Publication Data
US 2017/0303504 A1 Oct. 26, 2017

(51) Int. Cl.
*A61B 10/00* (2006.01)
*A01K 11/00* (2006.01)

(52) U.S. Cl.
CPC .......... *A01K 11/003* (2013.01); *A01K 11/004* (2013.01)

(58) Field of Classification Search
CPC .... A01K 11/001; A01K 11/002; A01K 11/003
See application file for complete search history.

(56) References Cited

U.S. PATENT DOCUMENTS

| | | | | |
|---|---|---|---|---|
| 4,209,924 A | * | 7/1980 | Fearing | A01K 11/001 40/301 |
| 4,451,999 A | * | 6/1984 | Yvorra | A01K 11/001 40/301 |
| 5,473,830 A | | 12/1995 | Doble | |
| 6,666,170 B1 | | 12/2003 | Hilpert | |
| 2003/0000119 A1 | * | 1/2003 | Savy | A01K 11/001 40/301 |
| 2010/0210011 A1 | | 8/2010 | Hilpert et al. | |

FOREIGN PATENT DOCUMENTS

| | | |
|---|---|---|
| DE | 29920134 | 10/2000 |
| WO | 2014042540 | 3/2014 |

* cited by examiner

*Primary Examiner* — Eric J Messersmith
(74) *Attorney, Agent, or Firm* — Duane Morris LLP; J. Rodman Steele, Jr.; Gregory M. Lefkowitz

(57) ABSTRACT

A device (1) to tag an animal is disclosed. The device comprises a female (20) including a case (21) with a thorough hole (22), a male (40) to be coupled to the female (20) and including a stem (41) with a tip portion (60); the female (20) includes tamperproof fastening means (23) adapted to block the tip portion (60) in the thorough hole (22) and wherein, after coupling the male (40) with the female (20), the hole (22) is closed by the tip (60), the tip becomes part of the female (20) and the stem (41) moves in the case (21).

19 Claims, 4 Drawing Sheets

DEVICE AND METHOD TO TAG AN ANIMAL

CROSS-REFERENCE TO RELATED APPLICATIONS

This application is a § 371 national stage entry of International Application No. PCT/EP2014/072639, filed Oct. 22, 2014, the entire contents of which are incorporated herein by reference.

FIELD OF APPLICATION

The present invention relates to a device to tag an animal, including a female part and a male part, where the male is adapted to be inserted in the female, and wherein the female and/or the male comprise tamperproof means to prevent extraction of the male from the female, after coupling.

The present invention also relates to a method for tagging an animal, including the step of inserting a male in a female, wherein the male pierces an ear of the animal before entering the female and coupling to the female in a tamperproof manner.

More particularly, the invention relates to a device and a method of the type cited above which, in an embodiment, is adapted for sampling a tissue of the animal during the application of the tag to the animal.

PRIOR ART

Methods and devices to tag animals, and more particularly devices including a female part (female) with a case adapted to receive a male part (male) are know, for instance from U.S. Pat. No. 6,666,170 B1.

For applying such device to an animal, an ear of the animal is interposed between the female and a tip portion of the male; the tip portion is pressed against the ear to enter the case through a female opening, piercing the ear of the animal. Tamperproof means avoid the male and the female decoupling, so preventing re-usage of components.

More particularly, after coupling inside the case, the male is axially rotatable with respect to the female, to avoid damages to the ear of the animal, for example when the device becomes snagged in an obstruction, such as a fence or gate. However, the device is structured to resist to efforts to force the male back out through the case opening and thus to avoid illicitly re-use of the male or female.

In this respect, the case of U.S. Pat. No. 6,666,170 B1 has a flexible top portion including tamperproof means, through which the head of the male can be inserted but not extracted, and a closed bottom portion made in hard material which cannot be cut or broken; due to such closed bottom portion, the head of the male inside the case cannot be contacted after coupling. Moreover, due to a different strength of the material of the bottom portion of the case respect to the material of the male, a pulling action or retraction of the male after coupling results in the male fracturing and its head remaining in the case. Thus, the male and the female are rendered unusable, being the stem of the male broken and the case of the female filled with the head of the male.

The above devices suffer from some problems. The manufacturing of the case with the softer top portion including tamperproof means and the bottom closed portion in harder material is complicated. Moreover, due to the closed bottom portion, these devices are not adapted to hold a container for tissue sampling in the female; the container may be associated to the male but this solution is complicated and increases the cost of the male.

Another prior art tag device for marking an animal is schematically represented in FIG. 1. The tag comprises a male part, having a stem 101 and a tip 102, and a female part 111, having a receiving portion 112 for receiving the tip and at least a part of the stem upon application of the ear tag.

The tag comprises sample collecting means 103, detachably associated with the male part prior to application of the ear tag, and a sample container 113, detachably associated with the female part prior to application of the ear tag. The sample collecting means 103 are configured such that it becomes pressed into or through tissue of an animal upon application of the ear tag to generate a tissue sample, and to fall within the sample container 113, when the male is inserted in the female through the ear of the animal, detaching at the same time the sample container 113 from the female.

After inserting the male into the female, an enlarged portion 104 of the male remains engaged within a portion 114 of the female, preventing their disengagement. More particularly, the portion 114 of the female may be configured to break, if the male is pulled out from the female, and thus may act as a tamperproof mean.

However, since the female is opened at a bottom aperture 115, this configuration cannot prevent that the portion of the stem remaining outside the female is cut and that the enlarged portion 104 of the male is pushed outside the female, through the bottom aperture 115. Thus, this type of tag cannot provide the same reliability of U.S. Pat. No. 6,666,170 B1 as tamper proof. WO 2014/042540, U.S. Pat. No. 5,473,830 and US 2010/210011 disclose examples of devices to tag an animal according to the prior art.

The problem at the base of the present invention is that of providing a device to tag an animal having a same level of reliability of the best prior art device, for what concern tamperproof, but at the same time providing an alternative solution which may be easily adapted also for the applications where a tissue of the animal must be sampled or for applications where tamperproof is not mandatory but reusability of the tag device, especially of the female, is appreciated, thus overcoming the limitations that currently affects the prior art devices.

SUMMARY OF THE INVENTION

The solution idea at the base of the present invention is to provide a device comprising a female having a thorough hole, a male including a tip portion adapted to be blocked in the thorough hole, the tip portion becoming part of the female after male-female coupling and completely and definitively closing a bottom aperture of the hole in tamperproof manner, leaving the male movable in the case separately from the tip portion.

In particular, after or during male-female coupling, the tip portions detaches from the stem, leaving the male slidable in a predetermined measure inside the case and/or rotatable respect to the case, while the tip portion becomes a piece of the female, irremovably blocked in the case and acts as tamperproof means. A tamperproof flange is also associated to a top aperture of the female, preventing the male exiting from the top aperture.

Advantageously, according to the device of the present invention, the through hole available in the female before male-female coupling may be used as seat for a container for tissue sampling, to be ejected while the male enters the case.

As further advantage, the device according to the idea of invention mentioned above may be used for different applications.

Indeed, when tamperproof is required, the male is provided with the above mentioned tip portion, adapted to be blocked in the case to definitely close the female.

Instead, when tamperproof is not required and reusability is desired, a device not falling within the scope of protection of the present invention may be provided wherein the male is not provided with the tip portion but with a distal end, not adapted to be blocked in the case and not adapted to definitely close its bottom aperture. Thus, after male-female coupling, the female may be reused: indeed, the user may cut the male outside the case and enter the case through the flange at the top aperture, to push the distal end outside the case.

A device to tag an animal not falling within the scope of the present invention may comprise:
a female including a case with a thorough hole,
a male to be coupled to the female, including a stem with a tip portion;
characterized by the fact that the female includes tamperproof fastening means adapted to block the tip portion in the thorough hole and wherein,
after coupling the male with the female, the hole is definitely closed by the tip, the tip becomes part of the female and the stem is allowed to move in the case, separately from the tip portion.

More particularly, the stem is slidable in a predetermined measure inside the case and is axially rotatable, after male-female coupling.

At least a part of the tip portion is in full adherence with an inner portion of the case, to prevent an access to the case through the bottom aperture.

The tamperproof fastening means to block the tip portion in the case may be in a body of the case, for instance a recess along an inner surface of the case and inside which the tip portion engage in undercuts, while the male is axially inserted in the case, and from which the tip portion cannot be retracted. In this way, the tip portion definitely closes the bottom aperture of the case.

The top aperture of the case is associated with the tamperproof flange which is adapted to hold the stem inside the case, i.e. preventing its extraction from the top aperture. More particularly, the stem of the male includes a distal end of an increased thickness and the flange is configured to let the tip portion and the distal end of the stem to enter the case, when the male is axially inserted in the female, and to prevent the distal end being extracted from the case, after male-female coupling.

The tip portion and the stem may be in different materials. For instance, the tip portion is harder than the stem. The female body may be in flexible or resilient material. Preferably, the harder tip portion enters and partially deforms the resilient material of the female, improving adherence.

Different embodiments of the male are provided.

According to an embodiment of the invention, the tip portion of the male is fixed on the stem before male-female coupling, and the stem is detached from the tip portion, after or during male-female coupling. Weakening lines are provided to simplify detachment of the tip portion from the stem.

According to another embodiment, the stem is rotatable respect to the tip portion both before and after coupling with the female.

For applications requiring tissue sampling, the device may include a container in the through hole of the female; means to hold the container in the thorough hole are provided in the female and/or on the container and are configured to release the container when engaged by the tip portion of the male. Cutting means are arranged on the male or on the female or on the container to cut a tissue of the animal, when the male is inserted in the female. A plug is applied to the container, after sampling.

Further features and advantages of the present invention will be apparent from the description given here below with reference to the drawings, given only for exemplification and without any limitation on the scope of protection.

DETAILED DESCRIPTION

Figure 1:
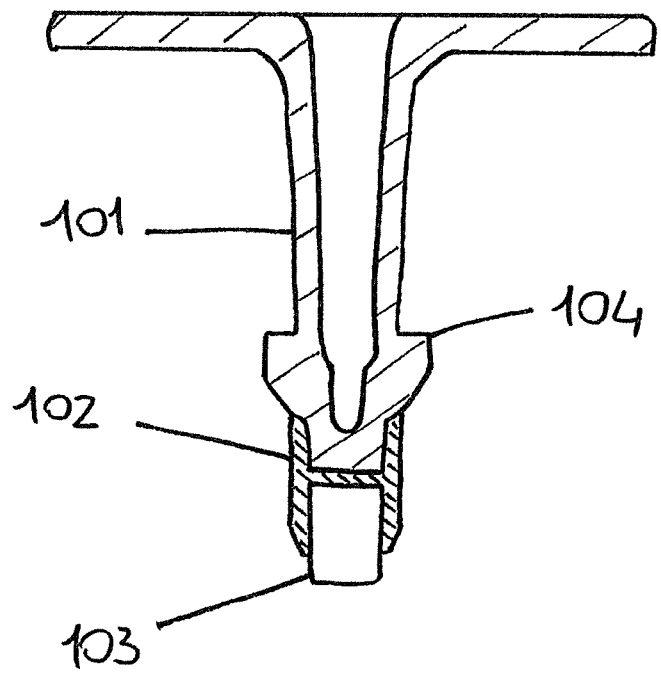
FIG. 1 is a view in section of a device according to the prior art.
Figure 1:
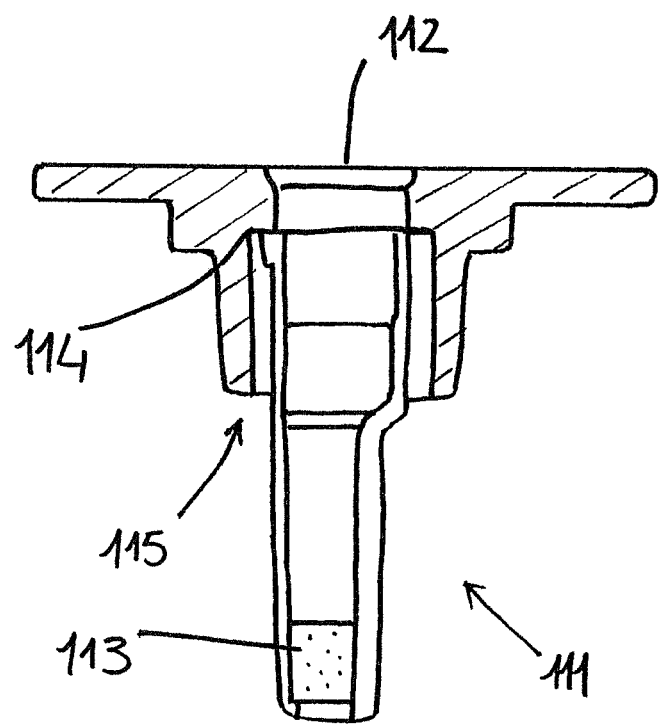
Figure 2:
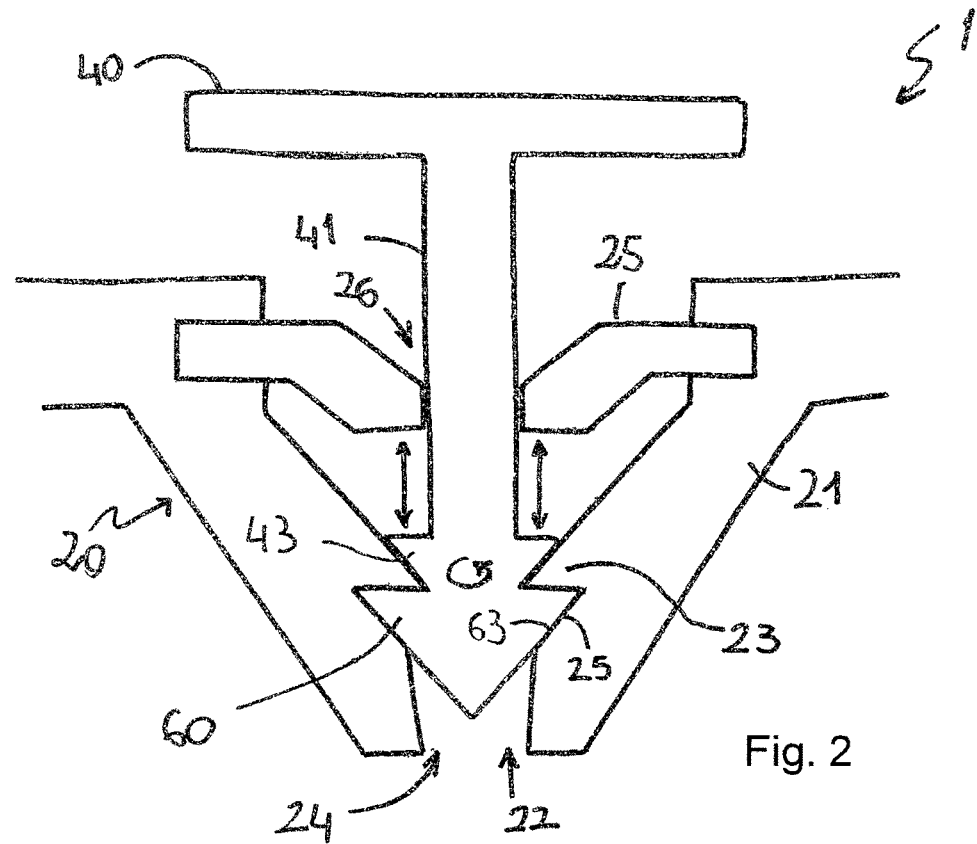
FIG. 2 is a view in section of a device according to the present invention.

With reference to FIG. 2 a device to tag an animal according to the present invention is schematically represented and globally indicated with 1. The device 1 include a male 40 and a female 20 with a case 21, adapted to receive a head of the male and to hold it in the case 21. The male and/or the female may carry visual information, for instance a label with a serial number or a bar code, and/or electronic information, for instance stored in a memory of an embedded chip.

For applying the devices to the animal, an ear of the animal is interposed between the female 20 and the head of the male 40; the head is pressed against the ear and enters the case, piercing the ear of the animal.

The female is for example in flexible or resilient material and includes the case 21 with a top aperture 26 and a bottom aperture 24. A tamperproof flange 25 is associated to the top aperture and is adapted to let the head of the male enter the case but not to exit from it. For instance, the flange includes flexible tabs inclined towards the inner of the case 21 and adapted to be distanced through the head of the male and to let it enter the case 21, when the male is applied to the female, and to close the head in the case, returning closer. If a force is applied to extract the male from the case (from the top opening), either the tabs brake or the male tip breaks. Thus, the flange is a tamperproof means which renders apparent and immediate an inappropriate use of the device.

After coupling inside the case, the male is axially rotatable respect to the female, to avoid damages to the ear of the animal, for example if the device becomes snagged in an obstruction, such as a fence or gate. Preferably, the male is also partially slidable within the case.

According to the present invention, the head of the male 40 includes a tip portion 60, the female includes a thorough hole 22 and tamperproof fastening means 23 adapted to block the tip portion 60 in the thorough hole 22 so that, after or during male-female coupling, the tip portion 60 detaches from the male, irremovably becomes a part of the female 20 and definitely closes the hole 22 in tamperproof manner, leaving the stem 41 free to move inside the case 21, separately from the tip portion.

More particularly, the stem is slidable in a predetermined measure inside the case and is rotatable respect to the case and the tip portion blocked in the case.

Advantageously, after male and female coupling, the tag device is highly reliable for tamperproof, because the bottom aperture 24 of the case is completely closed by the tip portion, which is irremovably blocked in the female, preventing an access to the case 21, but at the same time, before coupling the male 40 into the female 20, the bottom aperture 24 is opened and thus it may be used, for instance, to carry a container for tissue sampling.

In other words, according to the invention, the tip portion 60 of the tag device 1 is a part of the male 40 before male-female coupling and it detaches from the male 40 after coupling, becoming part of the female 40, forming a bottom hard seal for the case.

In this respect, at least a part 63 of the tip portion 60 is adapted to be in full adherence with a part of the case 21 towards the bottom aperture 24 of the case 21, to prevent an access to the case 21 through the bottom aperture 24. The size and shape of the case 21 and tip portion 60 prevent that a tool may be inserted between them, thus preventing access to the case to force the flange 25 and extract the male from the top aperture 26.

According to an embodiment of the invention, the tamperproof fastening means 23 are in a body of the case 21. For instance, with reference to FIG. 2, the case 21 has a recessed portion wherein a protrusion 63 of the tip portion 60 may enter in undercut, when the male is axially inserted from the top to the bottom of FIG. 2. Once the tip portion 60 is engaged in the recess, and the male is pulled from the bottom to the top of the FIG. 2 or is rotated, the stem 41 disengages from the tip portion 60, which is now part of the female 10.

Figure 3:
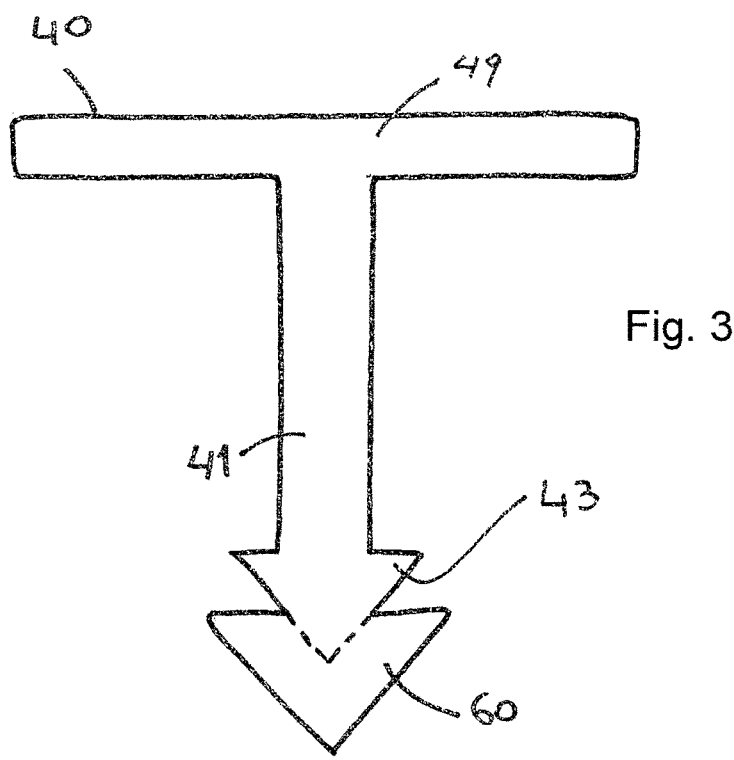
FIG. 3 is a view in section of a male of the device of FIG. 2.

FIG. 3 schematically represents a male according to an embodiment of the invention which is described hereafter. The male 40 has a cap 49 having a size greater than a size of the top aperture 26 of the female which is intended to remain outside the case. The stem 41 is between the cap 49 and the tip portion 60; this last is part of the male 40, before insertion into the female, as said above.

In one aspect of the invention, the tip portion 60 is fixed to the stem 41 before coupling male 40 and female 20, and the stem 41 is detached from the tip portion 60, after or during male 40 and female 20 coupling. A weakening line is provided between the tip portion and the stem, to simplify their detachment during or after insertion in the female.

The tip portion 60 and the stem 41 may be in different materials. For instance, the tip portion 60 is in a harder material than the material of the stem 41. Advantageously, the tip portion 60 in hard material may easily enter the recess in the case 21 and better close and protect the bottom aperture 24 of the case. The tip portion 60 is fixed on the male 40, for example, with ultrasonic welding.

The head of male 40 includes also a distal portion 43 (or distal end) which forms another tip adapted to remain on the stem 41 when the tip portion 60 is detached from the stem and blocked in the female. The distal portion 43 is adapted to engage the flange 25, when the male is pulled towards the top of FIG. 2, so preventing the male exiting through the top aperture 26. The distal portion 43 is between the stem 41 and the tip portion 60. The distal portion may be in a different material respect the stem and/or the tip portion; when ultrasonic welding is used for connecting the tip portion 60 on the male 40, the materials of the tip portion 60 and the distal portion 43 are selected accordingly, i.e. to improve ultrasonic welding.

Figure 6:
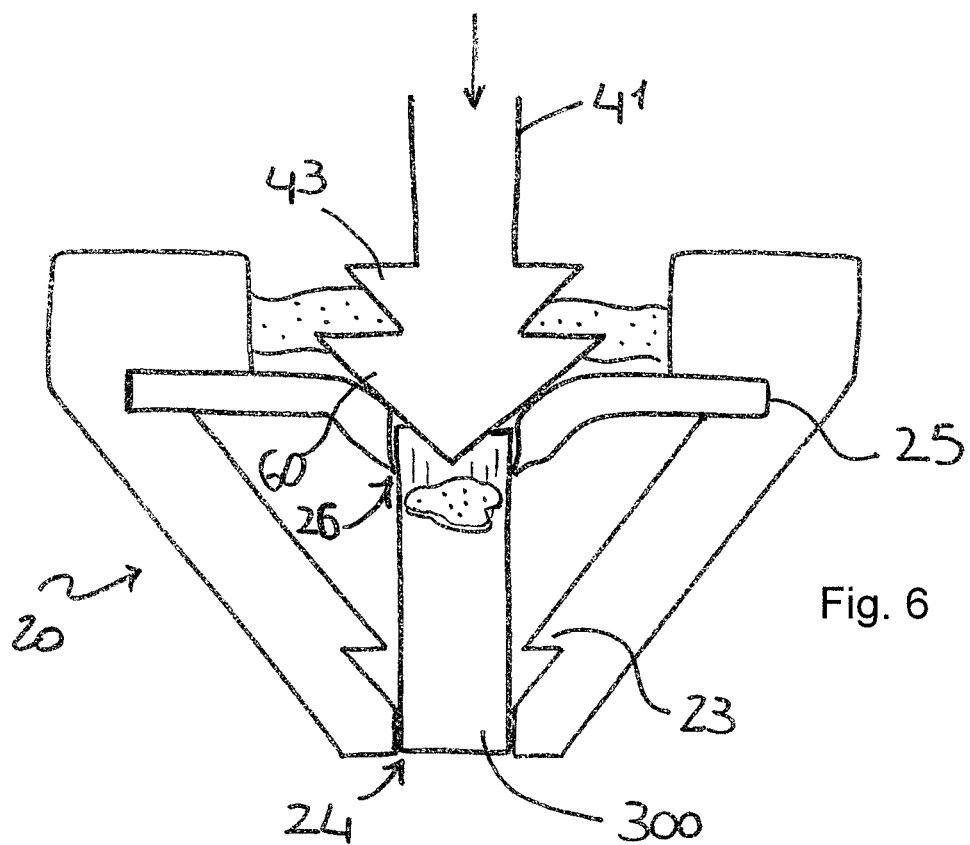
FIG. 6 is a view in section of a female of the device of FIG. 4, including a container for tissue sampling.
Figure 7:
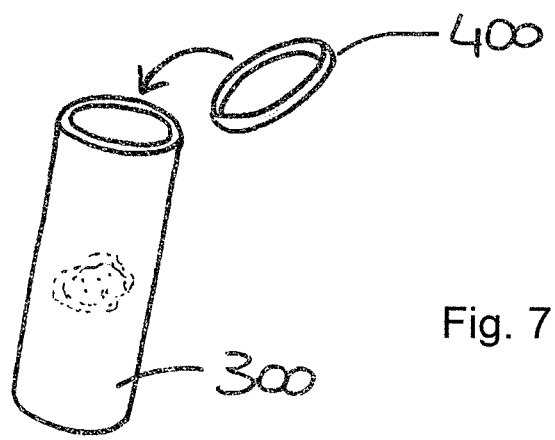
FIG. 7 is a view of the container of FIG. 6.

In the through hole 22, a tissue container 300 may be hold for instance in correspondence to the bottom aperture 24, as schematically represented in FIG. 6, where the male has not yet been completely coupled to the female. This drawing is only schematic and the tissue container 300 may be retained differently in the female, for instance only in the flange 25 or in the middle of the through hole.

When the male in inserted in the female, the tip portion 60 contacts the container 300 and pushes it out from the bottom aperture 24 of the case 21, and then closes the aperture 24 in tamperproof manner. Cutting means are arranged on the male 40 or on the female 20 or on the container 300 to cut a tissue of the animal, when the male 40 is inserted in the female 20. A plug 400 is provided to close the container, after sampling.

Figure 4:
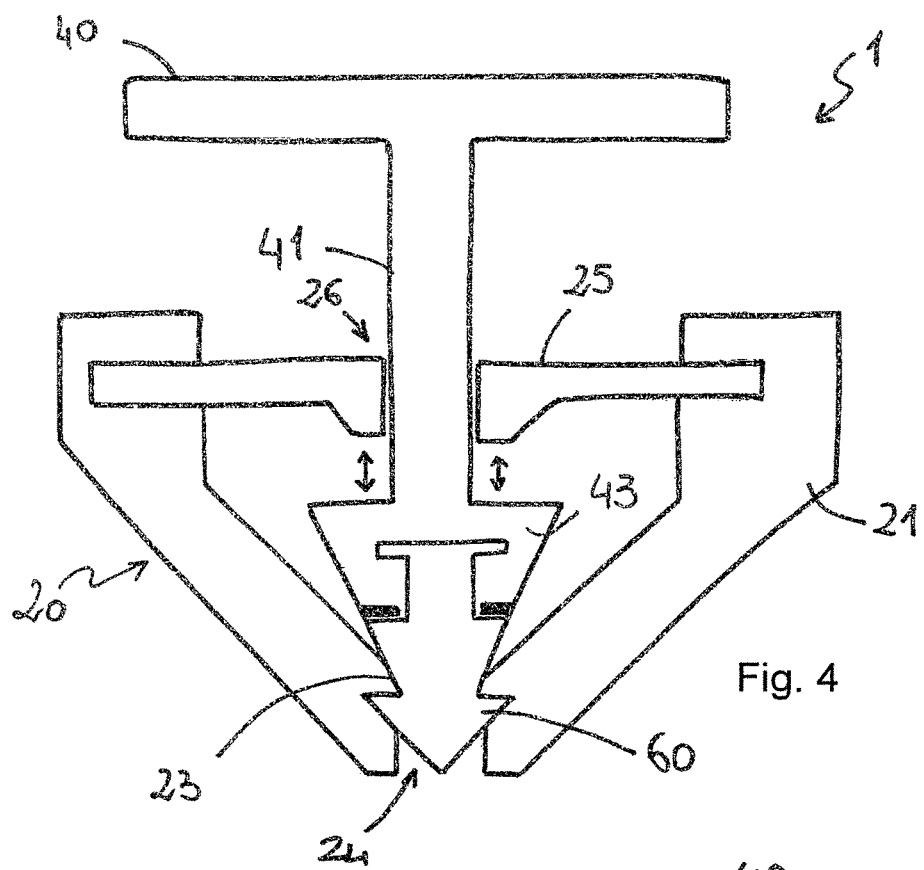
FIG. 4 is a view in section of a male of the device according to another embodiment of the present invention.
Figure 5:
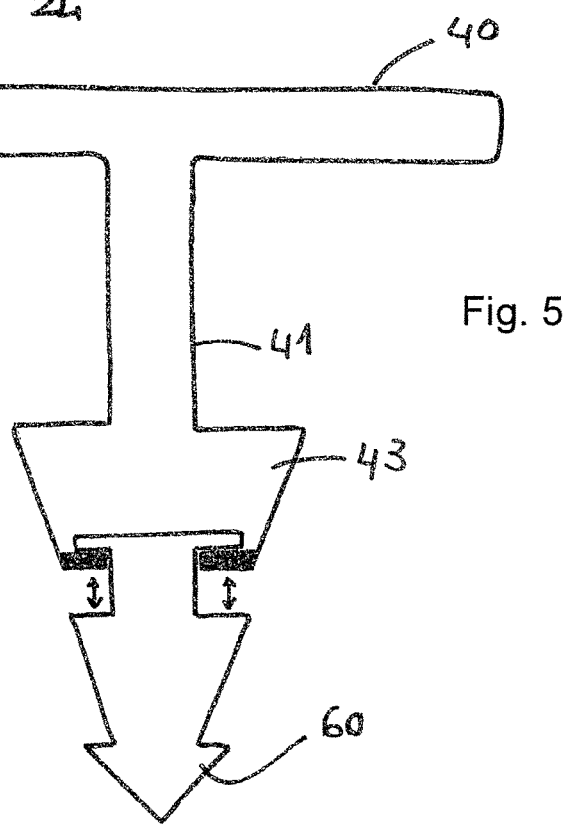
FIG. 5 is a view in section of a male of the device of FIG. 3.

According to FIGS. 4 and 5, another embodiment not according to the present invention is described, wherein the male is structured to rotate with respect to the tip portion 60 also before male-female coupling. As apparent for the skilled person, many features already disclosed above apply also to the second embodiment and thus are not repeated, for conciseness.

The male 40 of FIG. 5 comprises a stem 41 with a distal portion 43 which is engaged in slidable manner with a tip portion 60. The tip portion may rotate with respect to the stem and may also be retracted in a predetermined measure within the distal portion 43 or extended, as represented in FIG. 5.

When the male 40 in inserted in the female through the top aperture 26 of the flange, the tip portion 60 and the distal portion 43 pass through the flange 25, and then the tip portion is blocked in the fastening means 23, in the body of the female, becoming part of the female. The stem 41 may slide in the predetermined measure inside the case and may rotate on the tip portion 60, while the tip portion is fixed in the female body.

While examples of the male 40 with a tip portion 60 adapted to be blocked in the case 21 have been given with reference to FIGS. 3 and 5, other embodiments not falling within the scope of the present invention are not limited to these examples. For instance, the tag 1 may be in different shapes but always whitin the scope of protection of the present invention, i.e. with a tip portion which is adapted to close the case in tamperproof manner after male-female coupling, and firmly remain in the case, leaving the male free to move in the case.

Advantageously, the device according to the present invention is easy to be manufactured, cost effective, and easy to be applied to the animal, adaptable to different kind of application, i.e. for visual tagging, electronic tagging or tissue sampling, and highly reliable for tamperproof.

The invention claimed is:
1. Device to tag an animal comprising:
a female including a case with a thorough hole,
a male to be coupled to the female, including a stem with a tip portion;
wherein the female includes tamperproof fastening means adapted to block the tip portion in the thorough hole;
wherein the stem is rotatable with respect to the tip portion; and
wherein, after coupling the male with the female, the hole is closed by the tip, the tip becomes part of the female and the stem is movable in the case, further comprising weakening lines between the tip portion and the stem, said weakening lines being adapted to break during or after insertion of the stem in the female case, to detach the stem from the tip portion, and a tamperproof flange determining a top aperture of the case to prevent the stem exiting from the top aperture.

2. Device according to claim 1, wherein the stem is slidable in a predetermined measure and is rotatable inside the case.

3. Device according to claim 1 wherein at least a part of the tip portion is in adherence with an inner portion of the case to prevent an access to the case through the bottom aperture.

4. Device according to claim 1 wherein said tamperproof fastening means are in a body of the case.

5. Device according to claim 4 wherein the tip portion and the body are configured to engage in undercuts.

6. Device according to claim 1 wherein the stem includes a distal end of an increased thickness and wherein the flange is configured to let the tip portion and the distal end of the stem enter the case, when the male is coupled to the female, and to prevent the distal end exit the case, to avoid decoupling the male from the female.

7. Device according to claim 1 wherein the tip portion and the stem are in different materials.

8. Device according to claim 1 wherein the tip portion is in a different material than the material of the stem and the material of the tip is more hard than the material of the stem.

9. Device according to claim 1, wherein the female body is in flexible or resilient material.

10. Device according to claim 1, further comprising a container for tissue sampling, the container and/or the female including means to hold the container in the through hole, said means are configured to be engaged by the tip portion to push the container out from the case.

11. Device according to claim 10, further comprising cutting means arranged on the male or on the female or on the container to cut a tissue of the animal, when the male is inserted in the female.

12. Device according to claim 10, further comprising a plug to be applied to the container.

13. Device according to claim 1 wherein the case has a recessed portion wherein a protrusion of the tip portion engages in undercut when the male is coupled to the female.

14. Device according to claim 13, wherein the tip portion engaged in said recessed portion is adapted to detach from the stem due to a pull or a rotation of the male.

15. Device to tag an animal comprising:
a female including a case with a thorough hole,
a male to be coupled to the female, including a stem with a tip portion;
wherein the female includes tamperproof fastening means adapted to block the tip portion in the thorough hole; and
wherein, after coupling the male with the female, the hole is closed by the tip, the tip becomes part of the female and the stem is movable in the case;
further comprising weakening lines between the tip portion and the stem, said weakening lines being adapted to break during or after insertion of the stem in the female case, to detach the stem from the tip portion;
a tamperproof flange determining a top aperture of the case to prevent the stem exiting from the top aperture; and
a container for tissue sampling, the container and/or the female including means to hold the container in the through hole, said means are configured to be engaged by the tip portion to push the container out from the case.

16. Device according to claim 15, wherein the stem is rotatable with respect to the tip portion.

17. Device according to claim 15, wherein the stem is slidable in a predetermined measure and is rotatable inside the case.

18. Device according to claim 15, further comprising cutting means arranged on the male or on the female or on the container to cut a tissue of the animal, when the male is inserted in the female.

19. Device according to claim 15, wherein at least a part of the tip portion is in adherence with an inner portion of the case to prevent an access to the case through the bottom aperture.

* * * * *